United States Patent [15] 3,644,844

Bankovic [45] Feb. 22, 1972

[54] MULTIVIBRATOR CIRCUITS

[72] Inventor: Atanasije Bankovic, Belfort, France

[73] Assignee: Societe Industrielle Honeywell Bull, Paris, France

[22] Filed: Jan. 29, 1970

[21] Appl. No.: 6,682

[30] Foreign Application Priority Data

Jan. 31, 1969 France ............................6902.009

[52] U.S. Cl. ......................................331/113 R, 331/172

[51] Int. Cl. ..................................................H03k 3/282

[58] Field of Search ........................331/113, 143, 144, 145

[56] References Cited

UNITED STATES PATENTS 3,077,567 2/1963 Gray..................................331/113

*Primary Examiner*—John Kominski

*Attorney*—Lewis P. Elbinger, Fred Jacob and Ronald T. Reiling

[57] ABSTRACT

A transistorized multivibrator for furnishing output pulses having steep edges which are independent of the duration of the pulses, wherein each of a pair of branches comprises two interconnected transistors of opposite conductivity type and a resistor, and wherein a single capacitor is coupled between the two branches to function with each of the resistors as a common element in two time-constant circuits.

10 Claims, 3 Drawing Figures

MULTIVIBRATOR CIRCUITS

BACKGROUND OF THE INVENTION

The present invention relates to improvements in multivibrator circuits and more particularly to multivibrators in which the active elements are transistors. The scope of application of these multivibrator circuits is extremely broad since they are used in general as pulse generators.

Normally a multivibrator is composed of two circuit branches, each comprising one or more transistors and a time-constant circuit, which includes, most often, a resistor and a capacitor. Two output terminals deliver the pulses, the duration of each pulse being determined by a corresponding time-constant circuit. From both output pulses is determined, consequently, the duration of a cycle of operation. When it is desired that the duration of the output pulses be determined with good precision, either components (resistors and capacitors) of great precision, which are costly, must be utilized, or the two time constants must be separately adjusted by utilizing two adjustable resistors, which is equally costly.

These conventional multivibrators are subject to certain disadvantages. For example, the leading and trailing edges of the output pulses are correspondingly less steep as the duration of the pulses are increased, despite the need for pulses of relatively great duration which present steep edges. Also, although one of the two edges of a pulse may be sufficiently steep, but the other is elongated and deformed, which may be intolerable in certain cases.

The object of this invention is to provide an improved multivibrator circuit without the above mentioned disadvantages; i.e., which is inexpensive to fabricate and to place into operation, and which furnishes pulses at the two outputs whose leading and trailing edges are steep regardless of the duration of the pulses.

It is known that a pulse generator can produce pulses with steep edges when the active elements trigger regenerative phenomena. A multivibrator of this type is known in which each of the two circuit branches comprises a transistor with four layers of the PNPN-type, which is approximately equivalent to an imbricated series connected PNP-transistor and NPN-transistor. Moreover in this multivibrator, each time-constant network includes a resistor connected to an emitter electrode of a corresponding transistor and a single and common capacitor connected between the two emitters. Unfortunately, this arrangement does not provide readily pulses of the correct form.

Thus, this invention aims at improving a multivibrator of the type described, so that it is simple to select pulses with rectangular or steep edges and to vary with a single adjustment the duration of the generated pulses within the limits of tolerances selected in advance.

SUMMARY OF THE INVENTION

Consequently, according to this invention, a multivibrator circuit is having active and passive members supplied by a voltage source and connected in two similar branches, each branch provided having at least two transistors of opposite conductivity types. In each branch a first transistor of a first conductivity type has its emitter connected to a first terminal of a first source of direct voltage through a resistor adapted to constitute a time-constant network and a second transistor of the opposite conductivity type has its emitter directly connected to the second terminal of the first voltage source and has its collector directly connected to a corresponding output terminal of the circuit, which terminal is coupled to the base of the first transistor. The base of the first transistor is connected through a diode for unilateral conduction to a source of reference voltage. The second transistor has its base connected through an appropriate impedance to the second terminal of the first voltage source. A capacitor is connected between the emitters of the first transistors of the two branches and has a capacitance which, as a function of the value of the aforementioned resistors, permits the determination of the durations of the two time intervals of a cycle of operation.

With the object of modifying the time overlap of the pulse edges available at the two output terminals, a variation of the construction provides for the addition in each branch of a third transistor of the same conductivity type as the second transistor. The base of the second transistor is connected both through a resistor to the first terminal of the first voltage source and to the collector of the third transistor, whose emitter is connected to the second terminal of the voltage source and whose base is directly connected to the collector of the first transistor of the other branch.

BRIEF DESCRIPTION OF THE DRAWING

The invention will be described with reference to the accompanying drawing, wherein.

DESCRIPTION OF THE PREFERRED EMBODIMENT

Figure 1:
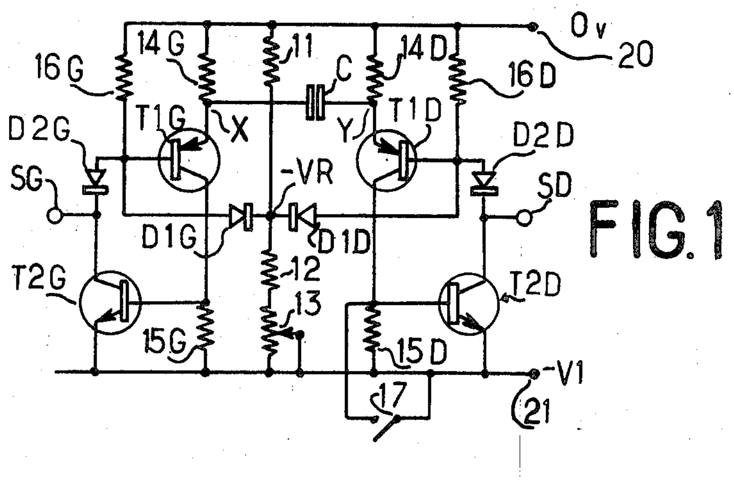
FIG. 1 is a schematic diagram of a first embodiment of the multivibrator of the invention.

FIG. 1 is an electrical schematic diagram of the simpler and more economical embodiment of the multivibrator circuit. This circuit is supplied from two terminals 20 and 21, which are assumed to be connected to the terminals of a source of direct voltage, not represented, furnishing to terminal 21 a voltage −VI, which may, preferably, be stabilized, although this is not always essential.

A voltage divider, comprising the resistors 11, 12, and 13 connected between terminals 20 and 21, permits obtaining at the point −VR an adjustable reference voltage. It is seen that the circuit is composed of two branches of identical structure. For example, in the left-hand branch, there is provided a resistor 14G connected between terminal 20 and the emitter of a first transistor T1G of the PNP-type. The collector of this transistor is connected both directly to the base of a second transistor T2G and to terminal 21 through a resistor 15G. The transistor T2G, which is of the NPN-type has its emitter connected directly to terminal 21. The base of transistor T1G is connected to terminal 20 through a resistor 16G, to the point −VR through a diode D1G having unilateral conductivity, and through a second diode D2G to an output terminal SG, to which the collector of transistor T2G is connected directly. The input resistance of a utilization device for the output pulses has not been represented.

A capacitor C has one of its plates connected to the junction point X between resistor 14G and the emitter of transistor T1G and the other plate connected to the junction point Y between a resistor 14D and the emitter of a transistor T1D. This capacitor forms, with each of resistors 14G and 14D, a time-constant circuit. If the two time intervals of an operating cycle must be of equal duration, the value of resistors 14G and 14D are the same. If, on the contrary, the two time intervals must be of unequal duration, the resistors 14G and 14D have appropriate different values.

It may be desirable that the operation of the multivibrator be "arrested," that is to say that the circuit be brought to a state of rest where the only two transistors of one branch will be conducting at saturation. For this effect, there is provided a switch represented symbolically at 17, and connected, in the present instance, between the base of transistor T2D and terminal 21. As is known, this switch may be of any convenient type and, in particular, it may be comprised of the spaced collector-emitter of a control transistor.

The state of rest of the multivibrator results from the closing of switch 17, as, for example, when the control transistor is conducting at saturation. The current of the base of transistor T2D is then stopped, and this transistor is nonconductive or cutoff. Meanwhile transistor T1D is conducting moderately because its base current is flowing through diode D1D and its collector current is absorbed by the closed switch. At this moment, the voltage on the right output terminal SD is slightly greater than −VR. Nothing prevents transistors T1G and T2G from being conductive, and even saturated, the voltage on the output SG then being greater, by a few tenths of a volt, than −V1. Capacitor C is then charged to a potential difference substantially equal to V1−VR, because the voltage VX of point X equals $-V1+V_{BE(T2G)}+V_{EC(T1G)}$, while the voltage VY at point Y equals $-VR+V_{D(D1D)}+V_{BE(T1D)}$.

Figure 3:
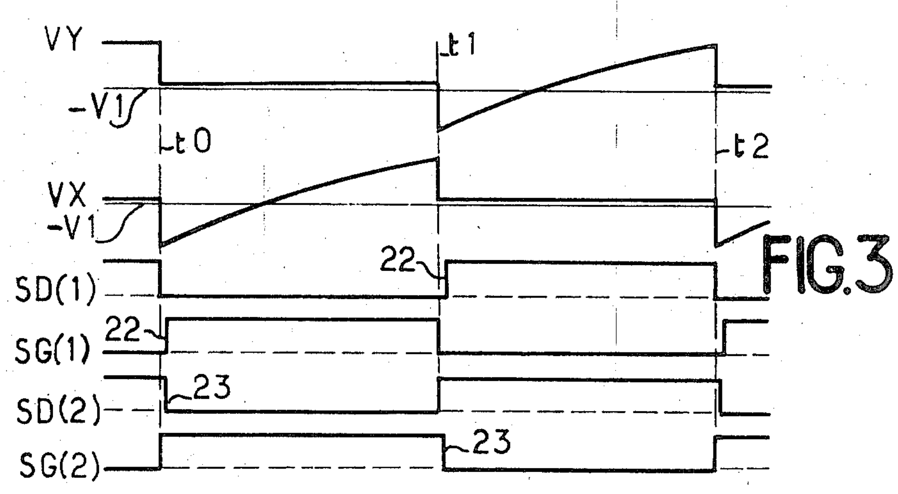
FIG. 3 is a timing diagram of waveforms available at certain points and at the outputs of the multivibrator.

FIG. 3 permits the examination of the development of voltages VX and VY and the voltages at the output terminals SD and SG, for example, beginning at the instant $t0$, when it will be assumed that switch 17 is opened. The current of the collector of transistor T1D can now flow in greater part through the base of transistor T2D, rendering this transistor conductive, and even saturated. From the cumulative effect provided by the imbricated series connection of the two transistors, transistor T1D is rapidly saturated and voltages VY and SD(1) fall abruptly to their lower level. The same occurs with the voltage VX at point X. In effect, capacitor C cannot be discharged instantaneously, so that a voltage swing substantially equal to that at point Y, is present at point X, which attains a minimum voltage point, much lower than −V1. Because of this fact, transistor T1G, and then transistor T2G, are cutoff. However, as they have been saturated prior to the instant $t0$, the phenomenon of desaturation has an effect such that the voltage on the output SG rises with some delay, as indicated by the positive edge such as 22 on the waveform SG(1).

Beginning at the instant $t0$, capacitor C commences to discharge, its discharge current being furnished by resistor 14G. Because the voltage of point Y remains constant during the interval $t0$–$t1$, the voltage of point X rises exponentially toward the 0-volt potential of terminal 20. There occurs a moment when voltage VX attains a threshold level slightly greater than −VR, beginning at which some current from the base of transistor T1G can flow through diode D1G, transistor TIG thereby becoming conductive again. From the regenerative phenomena produced at the instant $t1$, T1G and T2G are rapidly saturated, which forces the cutoff of transistors T1D and T2D, because it is now point Y which is driven to the minimum voltage point indicated previously. The voltage of output SG (waveform SG(1)) returns abruptly to its preceding lower level, while the voltage of output SD returns to its upper level, similarly with some delay. Following this, the capacitor is discharged through resistor 14D and the operation continues in the same manner so long as switch 17 remains open.

In the course of a time interval such as $t0$–$t1$, it is the resistor 14G which constitutes with the capacitor C a first time-constant network, and in the course of a time interval such as $t1$–$t2$, resistor 14D constitutes with capacitor C the second time-constant network. The duration of one pulse period depends both on the value of the time constant involved and the relationship between the aforementioned threshold level and the voltage of the minimum point mentioned previously. However, defining this threshold level and the latter voltage depends, to a close approximation, on the relationship between the voltage −V1 and the voltage −VR.

Thus, when the nominal values of resistors 14G and 14D and of capacitor C have been chosen, as well as of voltage −V1, precision resistors may be adopted for resistors 14G and 14D, for example having a tolerance of 2 percent or less. For capacitor C, there can be provided a capacitor with moderate tolerance and, therefore, of reasonable price. The fact that the value of resistance 13 is variable, suffices to provide a single adjustment to compensate for capacitance variation of capacitor C and for changing voltage −VR, by which are obtained pulses of the anticipated durations.

Even if the voltage furnished to terminals 20 an 21 varies slightly, this does not affect the duration of the output pulses, since what is significant in determining these durations is not the absolute values of voltages −V1 and −VR, but their relation, and this is fixed at the time of adjustment of the circuit.

A circuit equivalent to that of FIG. 1 may be conceived by interchanging in each branch the types of transistors T1 and T2. Thus, if transistors T1G and T1D are NPN-transistors and transistors T2G and T2D are of the PNP-type it is sufficient to invert the polarities of the applied voltages at terminals 20 and 21, and to orient in an inverse sense diodes D1G, D1D, D2G, and D2D.

These second diodes, such as diodes D2G and D2D, have as their sole function preventing current from the utilization device from flowing through the corresponding one of diodes D1G and D1D, when the two transistors of the one branch are cutoff. In the absence of such a possibility, diodes D2G and D2D can be eliminated.

For certain applications, the time interval between the positive edge of one pulse of one of the outputs and the negative edge of the preceding pulse on the other output may not be a disadvantage. Nevertheless, in the situation where the device controlled by the multivibrator is a bistable flip-flop which requires triggering by a low pulse level on only one input at a time, the embodiment in accordance with FIG. 1 is not suitable, since during such time interval the two outputs are at a low level of voltage, or negative.

The the contrary, a multivibrator in which these outputs can be both at a high, or positive, level during a short time is very convenient for controlling a bistable flip-flop of the type indicated above. It is for this purpose that the second embodiment of the multivibrator circuit, shown in FIG. 2, has been conceived. In this figure, the elements already existing in FIG. 1 and providing the same functions bear the same reference numerals.

The essential element which is added, in each of the branches of the circuit, is a third transistor, such as transistors T3G and T3D, of the same type as transistors T2, that is to say of the NPN-type. For example, in the left-hand branch, the emitter of transistor T3G is connected directly to terminal 21 and its collector is connected both directly to the base of transistor T2G and to terminal 20 through a resistor 18G. Transistor T3G constitutes an inverter amplifier in a common emitter circuit, its base being connected to the collector of transistor T1D of the other branch, instead of to the collector of transistor T1G. There is shown at 19G the input resistance of the utilization circuit connected to output SG.

Figure 2:
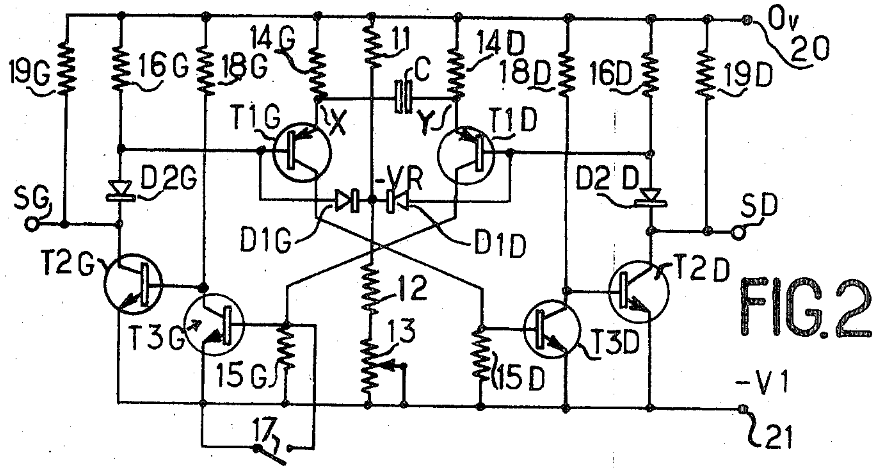
FIG. 2 is a schematic diagram of a second embodiment of the multivibrator of the invention.

If it is desired that the conditions of the state of rest or "arrest" of the circuit are to be the same as for the multivibrator of FIG. 1, switch 17 is now connected, as shown in FIG. 2, between terminal 21 and the base of transistor T3G. When switch 17 is closed, it absorbs the current from the collector of transistor T1D, which is moderately conductive. Transistor T3G is cutoff and the current furnished through resistor 18G constitutes the base current of transistor T2G, which is conducting at saturation, as is transistor T1G. The voltage on output SG is then at its low level. The greater part of the collector current of transistor T1G constitutes the current of the base of transistor T3D, which is conducting at saturation. The transistors employed being preferentially of the silicon type, the voltage $V_{CE}$ of saturated transistor T3D is insufficient for transistor T2D to be conductive. The latter is, therefore, cutoff and the voltage of output SD is at the high level, as shown in FIG. 3 (waveform SD(2)).

Assuming now that the switch is opened at the instant $t0$, transistor T3G is enabled to conduct at that instant, because the larger part of the collector current of transistor T1D forms its base current. Transistor T3G then rapidly saturates. Due to the amplification contributed by transistor T3G, the rapid cutoff of transistor T2G is provided and the voltage on output terminal SG rises rapidly. This cutoff of transistor T2G forces the cutoff of transistor T1G. The suppression of the collector current of transistor T1G provokes the cutoff of transistor T3D, which drives transistors T2D and T1D to saturation conduction, while the voltage on output SD drops abruptly, but with some delay, as is seen at 23, waveform SD(2). The developments of the voltages at points X and Y are as described previously and the same operation continues so long as switch 17 remains open.

With this second embodiment, it is seen from waveform SD(2) and SG(2) that the edges of positive sense are produced at the instants $t0$, $t1$, $t2$, etc., whereas the edges 23 of negative sense occur with a slight delay time. It follows that the two outputs SG and SD are not ever found at the low level at the same time.

Because much that has been described in the preceding and shown in the drawings is characteristic of the invention, it is evident that one skilled in the art can produce all modifications of form and detail deemed useful without departing from the scope of the invention.

I claim:

1. In a multivibrator circuit having its active and passive members supplied by a voltage source and connected in two similar branches, each branch having at least two transistors of opposite conductivity types, the improvement comprising: in each branch a first transistor of one type of conductivity having its emitter connected to a first terminal of a first direct voltage source through a resistor adapted to constitute a time-constant network, a second transistor of the opposite type of conductivity having its emitter directly connected to a second terminal of said first voltage source, having its collector directly connected to a corresponding output terminal of the circuit and coupled to the base of the first transistor, said base of said first transistor being connected through a diode for unilateral conduction to a source of reference voltage, said second transistor having its base connected through an appropriate circuit means to said second terminal of said first voltage source; and a capacitor being connected between the emitters of said first transistors of the two branches and having a capacitance which is a function of the values of said resistors and determines the durations of the two time intervals of a cycle of operation.

2. The multivibrator circuit of claim 1, wherein, in each branch, the base of the second transistor and the collector of the first transistor are connected together and through said circuit means to said second terminal of said first voltage source, and wherein said circuit means is a resistor.

3. The multivibrator circuit of claim 1, wherein each branch comprises a third transistor which is of the same type of conductivity as the second transistor, and wherein in each branch, the base of the second transistor is connected both through a resistor to said first terminal of said first voltage source and to the collector of the third transistor, the emitter of the third transistor is connected to said second terminal of said first voltage source, and the base of the third transistor is directly connected to the collector of the first transistor of the other branch.

4. The multivibrator circuit of claim 3, wherein a control switch is adapted to connect the base of the third transistor of one branch through a low-valued resistance to the second terminal of said first voltage source, in order to impose a state of rest on the circuit, in which state the first and second transistors of the same branch are conductive.

5. The multivibrator circuit of claim 4, wherein said source of reference voltage comprises a voltage divider branch between the first and second terminals of said first voltage source, which voltage divider branch includes a variable resistance to furnish an adjustable intermediate voltage.

6. The multivibrator circuit of claim 2, further including control switching means selectively adapted to render one of said branches nonconducting.

7. A multivibrator supplied by a voltage source having first and second terminals supplying a voltage difference therebetween, comprising: a pair of like branches connected between said terminals; each of said branches comprising a resistor connected to said first terminal and first and second transistors of opposite conductivity type connected between said resistor and said second terminal, the base of said first transistor being coupled to the collector of said second transistor, and the collector of said first transistor being coupled to the base of said second transistor in each of said branches, the emitter of said first transistor being coupled to said resistor and the emitter of said second transistor being coupled to said second terminal in each of said branches; a controllable source of reference voltage, means coupling the base of a corresponding one of said transistors in each branch to said controllable source; and a capacitor coupled between the emitters of said first transistors.

8. The multivibrator of claim 7 further including means coupled to one of said branches to selectively halt conduction in said one branch.

9. The multivibrator circuit of claim 6, wherein said control switching means is adapted to connect the base of the second transistor of one branch through a low resistance to the second terminal of said first voltage source, in order to impose a state of rest on the circuit, in which state the two transistors of the other branch are conductive.

10. The multivibrator circuit of claim 6, wherein said source of reference voltage comprises a voltage divider branch between the first and second terminals of said first voltage source, which voltage divider branch includes a variable resistance to furnish an adjustable intermediate voltage.

* * * * *

UNITED STATES PATENT OFFICE
CERTIFICATE OF CORRECTION

Patent No. 3,644,884 Dated February 22, 1972

Inventor(s) John J. Matysek

It is certified that error appears in the above-identified patent and that said Letters Patent are hereby corrected as shown below:

Column 5, Line 46, "118a" should read --118d--.

Column 12, Line 41, "is" should read --in--.

Column 15, Line 38, after "response" there should read --thereto providing excitation for said right-of-way indicator to cause said indicator to indicate traffic intervals; said traffic control system further comprising master control means connected to the power control means control input of each of said controls for controlling the power applied to each of said first switching means.--.

Signed and sealed this 4th day of July 1972.

(SEAL)
Attest:

EDWARD M.FLETCHER,JR.
Attesting Officer

ROBERT GOTTSCHALK
Commissioner of Patents